United States Patent [19]
Wiart

[11] 3,815,003
[45] June 4, 1974

[54] COMBINED SWITCH AND CHOPPER FOR SUPPLYING AN A.C. MOTOR

[75] Inventor: Albert Wiart, Sannois, France

[73] Assignee: Jeumont-Schneider, Paris, France

[22] Filed: Nov. 10, 1972

[21] Appl. No.: 305,431

[30] Foreign Application Priority Data
Nov. 16, 1971 France .............................. 71.40910

[52] U.S. Cl................. 318/211, 318/138, 318/227, 318/230
[51] Int. Cl. .......................................... H02p 3/20
[58] Field of Search .................... 318/138, 209–212, 318/227, 230, 231

[56] References Cited
UNITED STATES PATENTS

| 3,262,036 | 7/1966 | Clarke et al. ................... 318/227 X |
| 3,423,662 | 1/1969 | Schlabach et al. ............... 318/227 X |
| 3,543,131 | 11/1970 | Johnson .......................... 318/227 X |
| 3,548,275 | 12/1970 | Inagaki et al. ....................... 318/211 |

Primary Examiner—Gene Z. Rubinson
Attorney, Agent, or Firm—Raymond A. Robic

[57] ABSTRACT

A combined switch and chopper for supplying an a.c. motor with regenerative braking. The switch and chopper are characterised in that they comprise: a first set of routing thyristors whose anodes are connected to the positive side of a d.c. supply via a choke and the main thyristor of a first chopper and whose cathodes are connected to the motor terminals; a second set of routing thyristors whose cathodes are connected to the negative side of the supply via a second choke and the main thyristor of a second chopper and whose anodes are connected to the motor terminals; two thyristors for shunting the chokes; a first group of diodes whose cathodes are connected to the motor terminals and whose anodes are connected to a common point; a second group of diodes whose anodes are connected to the motor terminals and whose cathodes are connected to a common point; two switching thyristors connected in series between the common points, such thyristors being in antiparallel with the two diode groups; means for switching the thyristors comprising more particularly an auxiliary circuit for cyclically and alternately switching each routing thyristor set by way of the corresponding switching thyristor and corresponding diode group; two free wheel circuits helping to hold the motor current during periodic interruptions of the motor power supply; and a recovery circuit for braking the motor when the same is generating.

4 Claims, 3 Drawing Figures

COMBINED SWITCH AND CHOPPER FOR SUPPLYING AN A.C. MOTOR

The variable-frequency and voltage supply of a.c. machines, more particularly asynchronous squirrel-cage motors, from a constant-voltage d.c. supply makes it possible to construct commutatorless variable-speed motors. The underlying idea for systems of this kind is to apply the supply voltage alternately to the motor winding by way of a semiconductor facility and vary the length of the various positive and negative pulses. In U.S. Pat. application, Ser. No. 880,650, filed Nov. 28, 1969, now U.S. Pat. No. 3,639,819, Feb. 1, 1972, the Applicant suggested a motor supply system with the distinguishing feature of combining chopping with current-switching operations.

This invention relates to a combined switch and chopper for supplying a a.c. motor which has provision for regenerative braking, the invention being an improvement in or relating to the facility disclosed by the patent referred to since it leads to a reduction in both the number of thyristors flowed through by the main current and in the voltages applied to such thyristors and also makes it possible, if required, to use single-winding inductances.

The combined switch and chopper according to the invention is distinguished in that it comprises:

a first set of routing thyristors whose anodes are connected to the positive side of a d.c. supply via a choke and the main thyristor of a first chopper and whose cathodes are connected to the motor terminals;

a second set of routing thyristors whose cathodes are connected to the negative side of the supply via a second choke and the main thyristor of a second chopper and whose anodes are connected to the motor terminals;

two thyristors for shunting the chokes;

a first group of diodes whose cathodes are connected to the motor terminals and whose anodes are connected to a common point;

a second group of diodes whose anodes are connected to the motor terminals and whose cathodes are connected to a common point;

two switching thyristors connected in series between the common points, such thyristors being in antiparallel with the two diode groups;

means for switching the thyristors comprising more particularly an auxiliary circuit for cyclically and alternately switching each routing thyristor set by way of the corresponding switching thyristor and corresponding diode group;

two free wheel circuits helping to hold the motor current during periodic interruptions of the motor power supply; and a recovery circuit for braking the motor when the same is generating.

The invention will be better understood by reference to an embodiment and to the accompanying drawings, the embodiment being of a three-phase motor supply facility, the three figures of the drawings corresponding to three different forms of the auxiliary circuit mentioned and showing the circuit diagrams for the complete facility.

Figure 1:
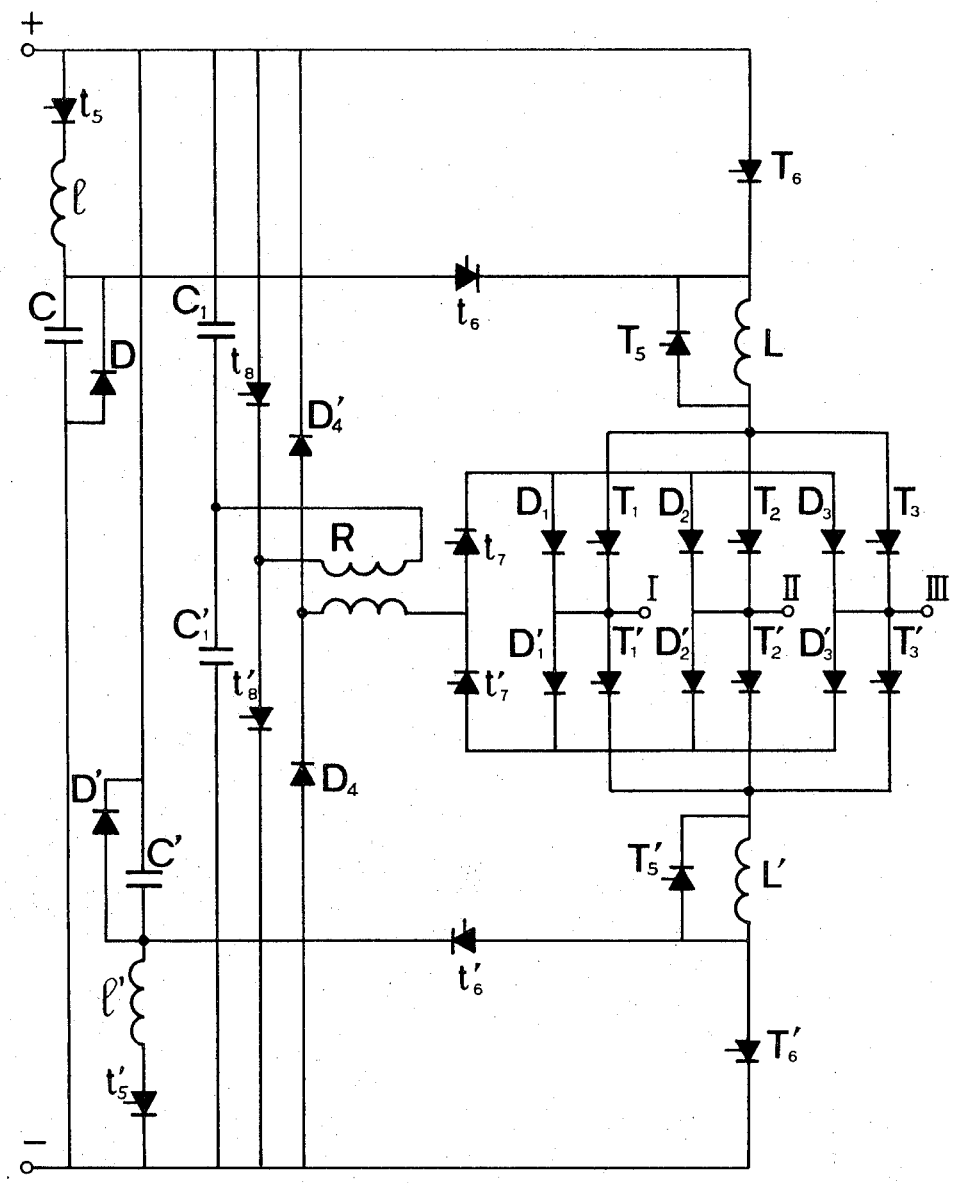
FIG. 1 illustrates a chopper of the conventional type.

FIG. 1 shows a first chopper which is of known kind and which comprises a main thyristor $T_6$, a circuit which serves to charge a capacitor C and which comprises a thyristor $t_5$ and an inductance 1 in series with the capacitor C, a free wheel diode D and a twin-off thyristor $t_6$ which, in the chopper example shown, also serves to close the free wheel circuit. The d.c. supply is represented by its positive and negative poles + and −.

At the bottom of FIG. 1 is a second chopper which is identical to the first chopper and which has the same references plus an apostrophe. Two sets each comprising three routing thyristors $T_1$, $T_2$, $T_3$ and $T'_1$, $T'_2$, $T'_3$ are disposed by way of two inductances L and L' between, and in series with, the two choppers, which are disposed symmetrically of the d.c. supply terminals.

Terminals I, II, III of a three-phase motor (not shown) are connected to the cathodes of thyristors $T_1$, $T_2$, $T_3$ and to the anodes of thyristors $T'_1$, $T'_2 T'_3$ respectively. The anodes of thyristors $T_1$, $T_2$, $T_3$ are connected to the inductance L in series with the first chopper, and the cathodes of thyristors $T'_1$, $T'_2$, $T'_3$ are connected to the inductance L' in series with the second chopper. Two three-diode groups $D_1$, $D_2$, $D_3$ and $D'_1$, $D'_2$, $D'_3$ arranged in the same way as the routing thyristors are shunted in antiparallel by two serially connected switching thyristors $t_7$, $t'_7$ respectively. The inductances L, L' can be shunted by thyristors $T_5$ and $T'_5$ respectively.

Basically, the system operates as follows: the d.c. output from the two serially connected choppers is distributed consecutively and cyclically to the various phases of the motor by way of the routing thyristors. When the current is changed over or switched in this way from one phase to another, the current flowing through the inductances L, L' remains substantially constant because of the presence of two possible free wheel circuits which will be discussed hereinafter, the diode groups permitting cyclic switching of the routing thyristors.

Switching of the chopper thyristors and of the switching thyristors is by means of a facility which is known and therefore not shown.

However, switching of the routing thyristors is by means of a special auxiliary circuit comprising a transformer R whose secondary winding is connected between the anode-cathode junction of thyristors $t_7$, $t'_7$ and the anode-cathode junction of two auxiliary diodes $D_4$, $D'_4$, which are connected in series but disposed in antiparallel across the supply, the primary winding of transformer R being connected between the centre points of two bridges both connected across the supply; these bridges are a first bridge, comprising two capacitors $C_1$, $C'_1$ in series, and a second bridge comprising two auxiliary thyristors $t_8$, $t'_8$ which are connected in series and which are arranged the other way round to the diodes $D_4$, $D'_4$.

A description will now be given of how the system shown operates. If at a given instant of time motor terminals I and III are being energized through chokes L and L' (the thyristors $T_5$ and $T'_5$ being non-conductive) and via the thyristors $T_6$, $T_1$, $T'_3$ and $T'_6$, to switch the positive side of the supply from terminal I to terminal II the main thyristor of chopper $T_6$ is first turned off by turning-on thyristor $t_6$, so that the cathode of thyristor $T_6$ has applied to it the voltage of the capacitor C which has previously been charged up to about twice the supply voltage because of resonance in the circuit comprising the integers C and 1. Once thyristor $T_6$ has been turned off, the current flow through the motor windings connected to terminals I and III is maintained in magnitude and direction by means of the inductances L, L', for this current can flow through a first free wheel circuit comprising the thyristor $t_6$, the inductance L, one of the thyristors of each set of routing thyristors, the inductance L', the thyristor $T'_6$ and the diode D.

To turn off thyristor $T_1$, the inductance L is short circuited by the thyristor $T_5$ being turned on but this does not interrupt the free wheel operation just described — so that the anode of thyristor $T_1$ is raised to a potential which is at most equal to the potential of the negative terminal of the supply, whereafter the potential of the diode $D_1$ is made appreciably higher than the potential of the cathode of thyristor $T_1$ by means of the special auxiliary circuit previously referred to; such circuit is so devised that when the thyristors $t_7$, $t_8$ are turned-on, the capacitor bridge $C_1$, $C'_1$ discharges via the primary winding of transformer R, whose secondary winding outputs via the diode $D_4$, the thyristor $t_7$ and the diode $D_1$ a voltage of appropriate magnitude and direction to turn off the thyristor $T_1$. To energize the winding connected to motor terminal II, the thyristor $T_2$ is turned-on and the thyristor $T_6$ is turned-on again so that the voltage on the anode of thyristor $T_2$ is the positive supply voltage — i.e., appreciably higher than the voltage on the anodes of diodes $D_1$, $D_2$, $D_3$. Switching between motor terminals is therefore performed by this voltage difference despite the inductive effect of the windings in operation. Once the motor current exceeds the current flowing through the choke L, the thyristor $T_5$ turns off, whereafter the motor is energized in the conditions originally considered except that the winding which extends to terminal II has taken the place of the winding connected to terminal I. During the time when switching is actually taking place, the total current distributed consecutively to the motor phases has remained constant.

Since the system is symmetrical, operation of the facility with the second chopper can readily be gathered from what has just been described with reference to the first chopper; however, the free wheel circuit in the case of operation with a second chopper would be the symmetrical circuit of the first case, namely choke L', the thyristor $t'_6$, the diode D', the thyristor $T_6$, the choke L etc. There are therefore two possible free wheel circuits.

The same facility is a means of enabling the motor to regenerate to its d.c. supply. If the two thyristors $T_6$, $T'_6$ are both turned "off" simultaneously, current can flow from one side of the d.c. supply to the other via the recovery circuit comprising the diode D, the thyristor $t_6$ and the inductance L, one of the thyristors of each routing thyristor set, those windings of the motor which are in operation, the inductance L', the thyristor $t'_6$ and the diode D'.

To adjust the current on motoring, direct-energization operations via the choppers are alternated with free wheel operations. To adjust the current on regenerative braking, free wheel operations are alternated with recovery or regeneration operations.

The facility described normally has associated with it a known light current or electronic control system to ensure that the operating sequences arising from the description just given are carried out. In particular, the control system must keep the mean voltage or current at the required value by appropriate control of the "on" and "off" times of the chopper thyristors and it must ensure that current switchings to the various motor windings occur at the required frequency.

Figure 2:
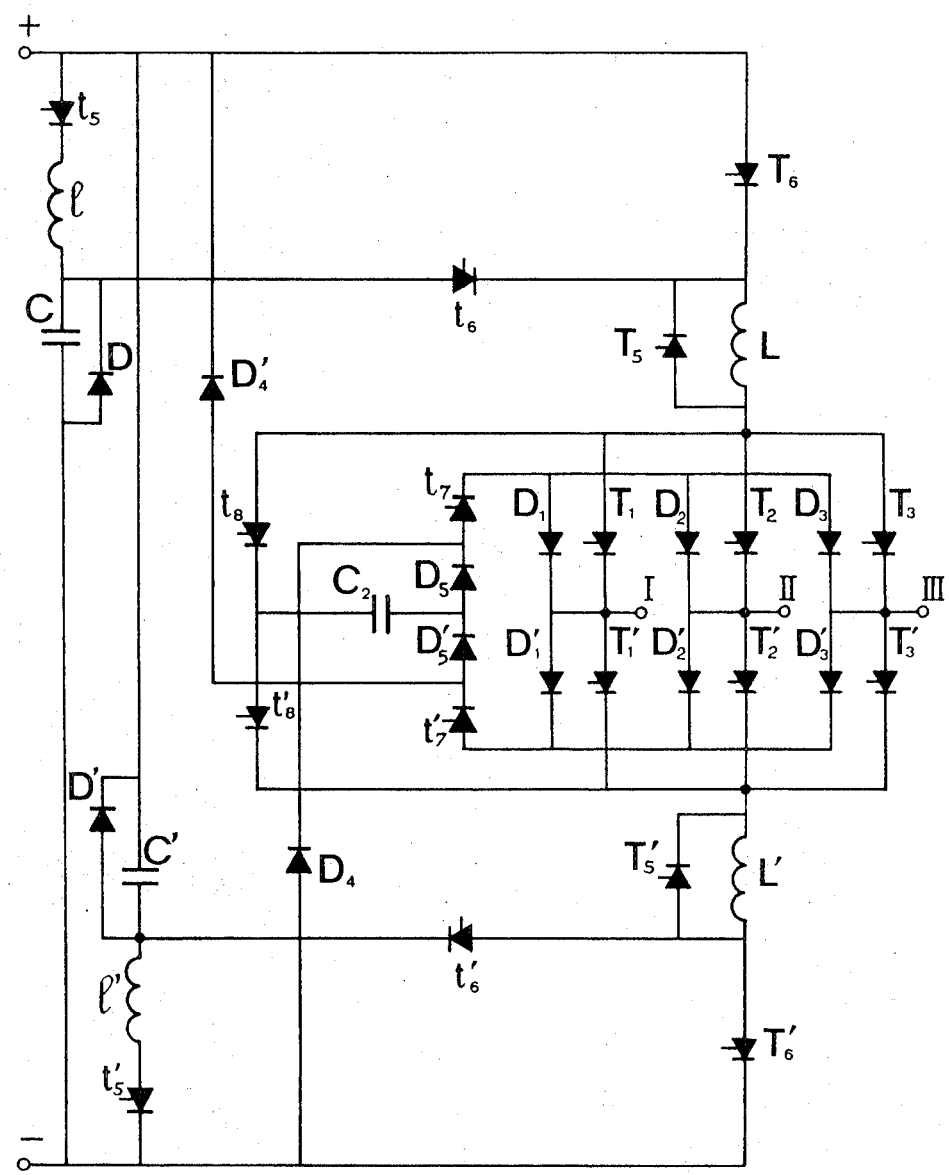
FIGS. 2 and 3 illustrate choppers similar to the one of FIG. 1 but with different auxiliary circuits.
Figure 3:
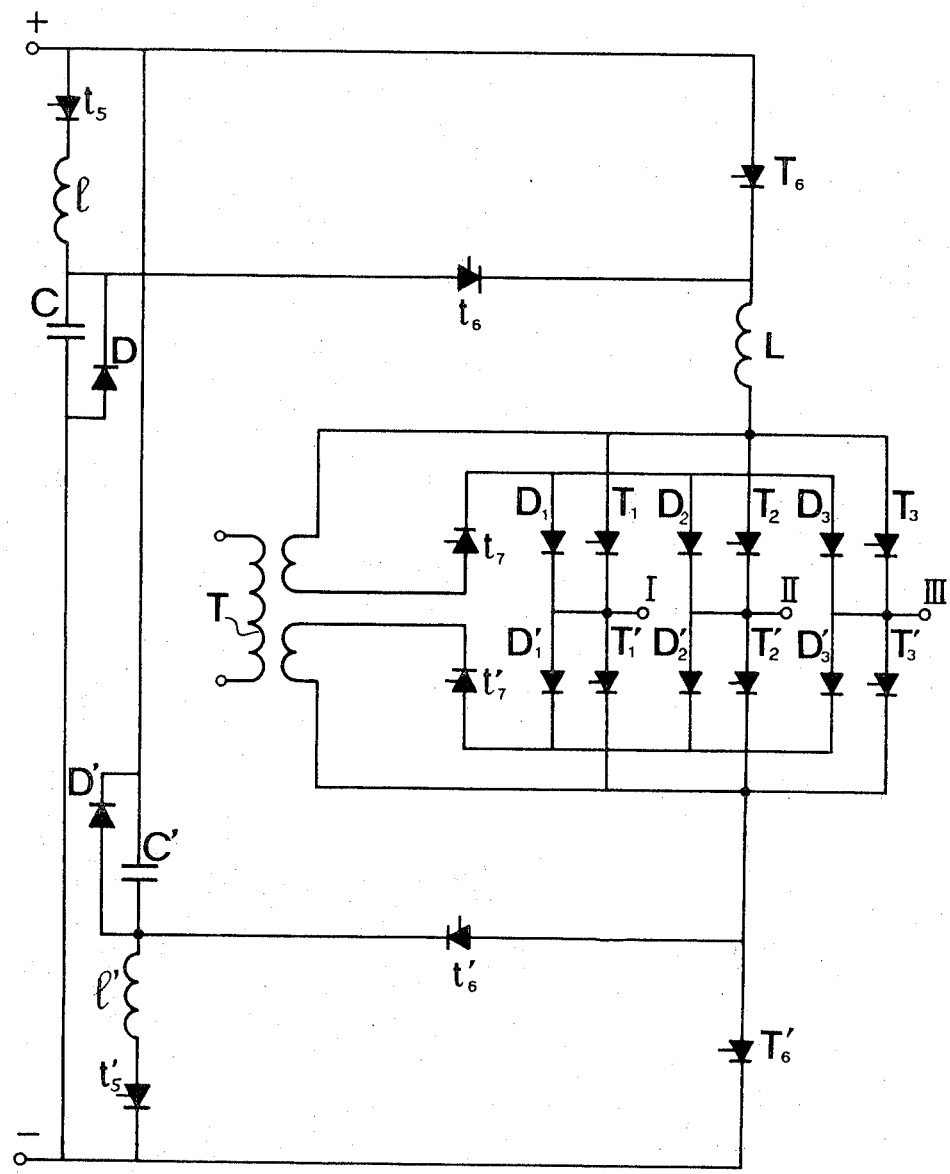

FIGS. 2 and 3 show the same facility as in FIG. 1 except that the auxiliary circuits are different. Like elements have like references.

The auxiliary circuit of FIG. 2 comprises a bridge in which two auxiliary thyristors $t_8$, $t'_8$ in series with one another are shunted across the routing thyristors, two auxiliary diodes $D_5$, $D'_5$ in series with one another are connected between the thyristors $t_7$ and $t'_7$ the same way round, and a capacitor $C_2$ is connected between the centrepoint of the bridge $t_8$, $t'_8$ and the connection via which the diodes $D_5$, $D'_5$ are in series with one another the bridge also comprising two other auxiliary diodes $D_4$, $D'_4$. Diode $D_4$ has its anode connected to the negative side of the supply and its cathode connected to the connection between the diode $D_5$ and the thyristor $t_7$. Diode $D'_4$ is connected on the positive side symmetrically in relation to diode $D_4$, the anode of diode $D'_4$ being connected to the connection between the diode $D'_5$ and the thyristor $t'_7$. Capacitor $C_2$ can be discharged by either thyristors $t_7$ and $t_8$ or by thyristors $t'_7$, $t'_8$. The diodes $D_4$, $D'_4$ form two auxiliary free wheel circuits.

Operation is as follows: It will be assumed that it is required to extinguish thyristor $T_1$ and make thyristor $T_2$ conductive. Capacitor $C_2$ is at this juncture charged to the supply voltage, its left-hand side being negative and its righthand side being positive. Thyristors $t_7$, $t_8$ are turned-on. The discharge of capacitor $C_2$ through the circuit comprising the diode $D_5$, the thyristor $t_7$, the diode $D_1$, the thyristor $T_1$, the thyristor $t_8$ and the capacitor $C_2$ extinguishes thyristor $T_1$ and the motor current, which the inductances L, L' help to hold, continues to flow by the path comprising the elements L, $t_8$, $C_2$, $D_5$, $t_7$, $D_1$, $D_2$ and $D_3$ as well, the motor, L' and so on. Thyristor $T_6$ must now be turned-on, unless it has already been turned-on, and thyristor $T_5$ must also be turned-on to short circuit the inductance L. The motor current is held by way of inductance L'. Capacitor $C_2$ discharges by supplying the motor current in this way, and then charges up the opposite way round until its voltage becomes equal to the supply voltage, current then flowing via the auxiliary free wheel diode $D_4$.

Thyristor $T_2$ is then turned on. Its anode voltage is the positive supply voltage, whereas the voltage at the anodes of diodes $D_1$, $D_2$, $D_3$ is the negative supply voltage applied via diode $D_4$ and thyristor $t_7$. Because of this potential difference, the current previously flowing through the diodes $D_1$, $D_2$, $D_3$ is switched to flow through thyristor $T_2$. Switching has therefore been performed.

The diodes $D_5$, $D'_5$ are to prevent accidental discharging of capacitor $C_2$ through diodes $D_4$, $D'_4$. Also, it may be advantageous to use instead of the diodes $D_5$, $D'_5$ thyristors controlled at the same time as $t_7$, $t_8$ or $t'_7$, $t'_8$, respectively. This feature separates the switching circuits associated with thyristors $T_1$, $T_2$, $T_3$ from the switching circuits associated with the thyristors $T'_1$, $T'_2$, $T'_3$, a feature which may be useful if switching of a routing thyristor group is required to begin before the switching of the other group has finished.

Referring to FIG. 3, the switching thyristors $t_7$, $t'_7$ have no connection which puts them in series with one another, and the auxiliary circuit comprises a transformer T having two secondary windings. The anodes of the first set of routing thyristors $T_1$, $T_2$, $T_3$ are connected to the anode of the corresponding switching thyristor $t_7$ by way of one of the secondary windings, the other of which is connected symmetrically of the first to the other switching thyristor $t'_7$. The transformer primary is cyclically energized by known means to provide an auxiliary switching voltage for the routing thyristors.

It will be assumed that it is required to switch the current of thyristor $T_1$ to thyristor $T_2$. Thyristor $t_7$ must therefore be turned-on and the transformer primary must be energized so that current flows in the conductive direction of thyristor $t_7$. The current which flowed originally through thyristor $T_1$ is then collected by the transformer secondary in series with the thyristor $t_7$ and sent to the elements $t_7$, $D_1$, $D_2$, $D_3$. Thyristor $T_1$ goes out.

So that the current flowing through the diodes $D_1$, $D_2$, $D_3$ can now be switched to thyristor $T_2$, the transformer supply voltage must be reversed so that the secondary outputs a voltage tending to cancel the current flowing through the diodes $D_1$, $D_2$, $D_3$ and return such current to thyristor $T_2$. To this end, the transformer T is energized by an auxiliary supply, such as an inverter connected to the d.c. supply source, transformer energization being such that a secondary voltage is applied in the directions just defined. In the case shown in FIG. 3 the auxiliary switching voltage for the routing thyristors is so transmitted by transformer T that switching is independent of the operation of the thyristors $T_6$, $T'_6$. Current flows continuously through inductance L, which is a single device in this case and is not short-circuited by a thyristor $T_5$. In this case too, only one of the choppers is needed, but if only one is used there can be no regenerative braking.

A comparison of the three examples shown in FIGS. 1–3 will show that current switching to the routing thyristors becomes increasingly independent — i.e., increasingly independent of the operation of the thyristors $T_6$ and $T'_6$ — as one goes from FIG. 1 to FIG. 3.

The supply system according to the invention can be used with advantage to make a commutatorless motor wound like a rotating-field polyphase motor give similar performances to a commutator motor, with a d.c. supply. It is of use for traction motors.

I claim:

1. A combined switch and chopper for supplying an a.c. motor with regenerative braking, characterised in that it comprises:
   a first set of routing thyristors whose anodes are connected to the positive side of a d.c. supply via a choke and the main thyristor of a first chopper and whose cathodes are connected to the motor terminals;
   a second set of routing thyristors whose cathodes are connected to the negative side of the supply via a second choke and the main thyristor of a second chopper and whose anodes are connected to the motor terminals;
   two thyristors for shunting the chokes;
   a first group of diodes whose cathodes are connected to the motor terminals and whose anodes are connected to a common point;
   a second group of diodes whose anodes are connected to the motor terminals and whose cathodes are connected to a common point;
   two switching thyristors connected in series between the common points, such thyristors being in anti-parallel with the two diode groups;
   means for switching the thyristors comprising more particularly an auxiliary circuit for cyclically and alternately switching each routing thyristor set by way of the corresponding switching thyristor and corresponding diode group;
   two free wheel circuits helping to hold the motor current during periodic interruptions of the motor power supply; and
   a recovery circuit for braking the motor when the same is generating.

2. A combined switch and chopper according to claim 1 wherein the auxiliary circuit comprises:
   a transformer whose secondary winding is connected between the anode-cathode junction of the two switching thyristors and the anode-cathode junction of two auxiliary diodes connected in series and connected in anti-parallel between the poles of the power supply, the transformer primary winding being connected between the centre points of two bridges disposed in parallel to the supply terminals, viz a first bridge comprising two capacitors in series, and a second bridge of two serially connected auxiliary thyristors arranged the opposite way round to the auxiliary diodes; and
   a means for simultaneously turning-on one of the auxiliary thyristors to discharge the capacitor bridge via the transformer primary, the switching thyristor allowing current to flow from the transformer secondary through one of the auxiliary diodes to the corresponding diode group.

3. A switch and chopper according to claim 1 wherein the auxiliary circuit comprises:
   a bridge of two serially connected auxiliary thyristors in parallel with the routing thyristors;
   two serially connected first auxiliary diodes disposed between, and the same way around as, the two switching thyristors;
   a capacitor connected between the centre point of the auxiliary thyristor bridge and the series connection between the two diodes;
   two other auxiliary diodes, one having its anode connected to the negative side of the supply and its cathode connected to the anode of the switching thyristor associated with the first chopper, the other of the two other auxiliary diodes being connected symmetrically in relation to the first such diode; and
   means for turning-on the auxiliary thyristors seriatim simultaneously with the corresponding switching thyristor.

4. A switch and chopper according to claim 1 but in which the switching thyristors have no provision for being connected in series and the auxiliary circuit comprises:
   a transformer having two secondary windings, the anodes of the first routing thyristor set being connected to the anode of the corresponding switching thyristor by way of one of such secondary windings, the other winding being connected, in symmetrical relation to the first winding, with the other switching thyristor, and
   means for so cylically energizing the primary winding of such transformer as to produce an auxiliary voltage for switching the routing thyristors.

* * * * *